July 19, 1966     H. B. ELLIS ETAL     3,261,163

ROCKET MOTOR TESTING APPARATUS

Filed June 19, 1961     5 Sheets-Sheet 1

INVENTOR.
RICHARD G. PEOPLES
HERMAN C. KRIEG, JR.
ROLLO S. PICKFORD
HERBERT B. ELLIS
STANLEY W. BAKER
JOHN E. TAHL

ATTORNEY

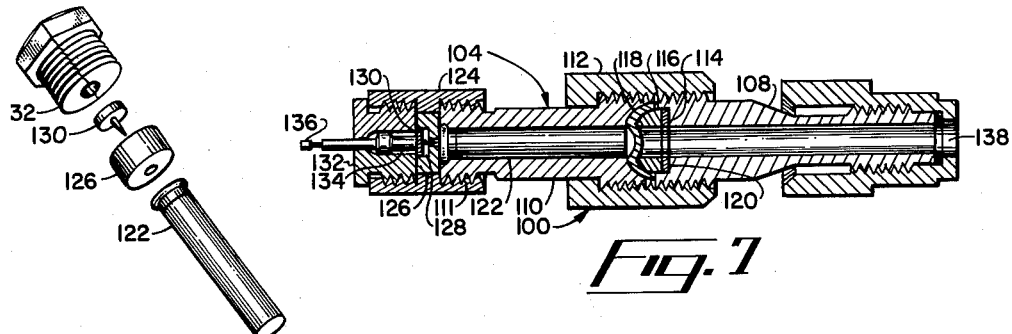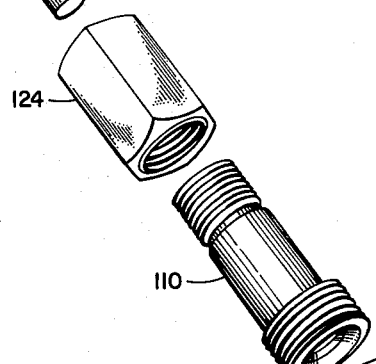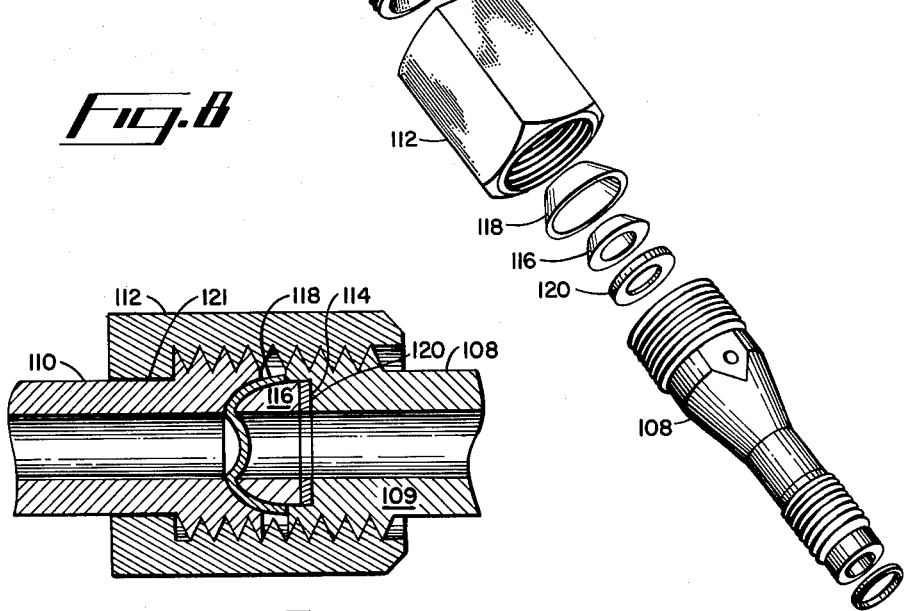

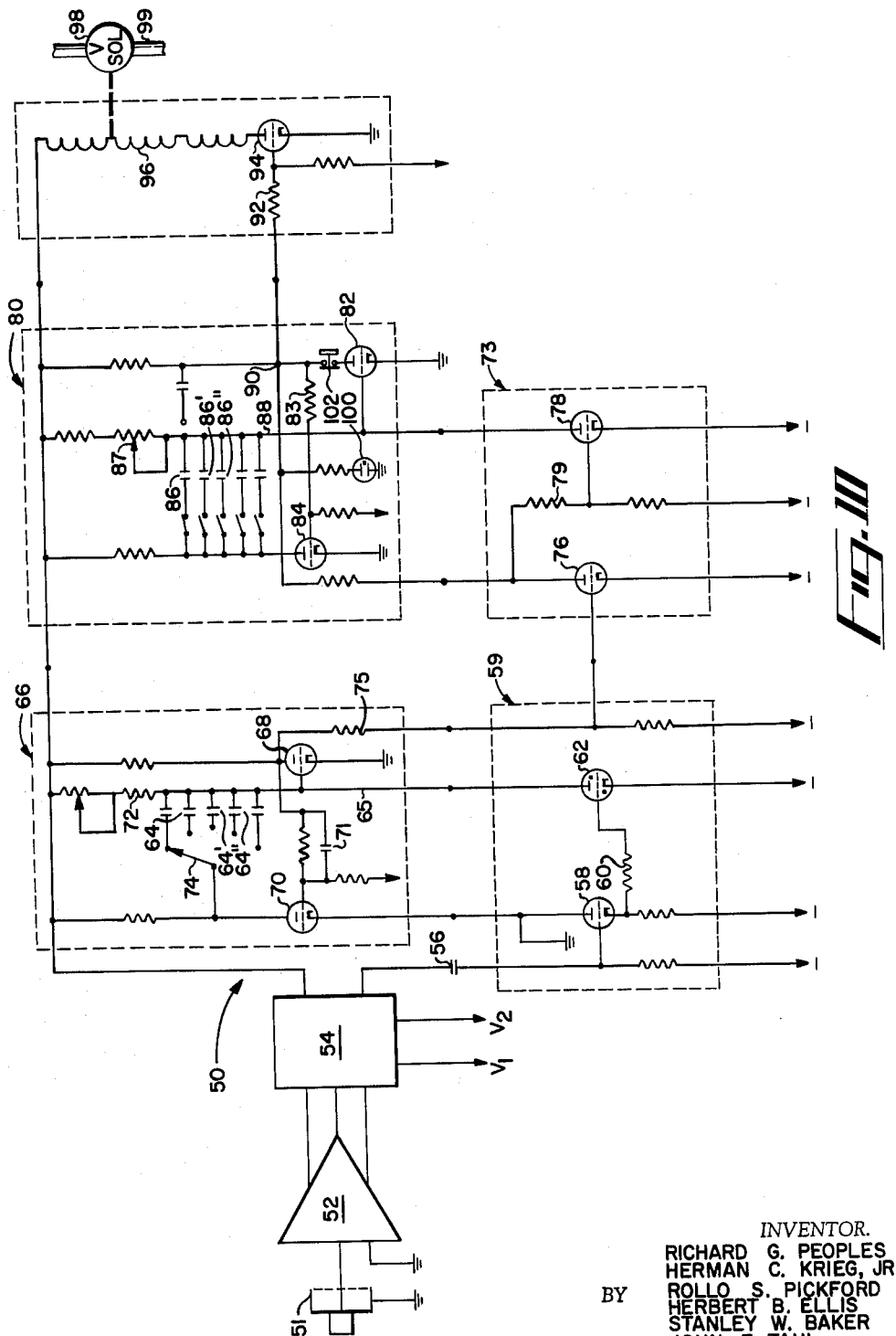

3,261,163
ROCKET MOTOR TESTING APPARATUS
Herbert B. Ellis, Pasadena, Richard G. Peoples, Covina, Herman C. Krieg, Jr., La Puente, Rollo S. Pickford, Sierra Madre, Stanley W. Baker, West Covina, and John E. Tahl, Sierra Madre, Calif., assignors to Aerojet-General Corporation, Azusa, Calif., a corporation of Ohio
Filed June 19, 1961, Ser. No. 117,929
5 Claims. (Cl. 60—35.6)

This invention relates to apparatus for designing a rocket motor to eliminate high frequency combustion chamber instability.

High frequency combustion chamber instability, primarily of the tangential mode, has long been a problem to designers of rocket motors. Physically, the occurrence of high frequency combustion chamber instability means that when the motor operates, a destructive shock wave is established which travels around the combustion chamber of the motor at a high cyclic frequency which is damaging to the structure.

When designing a rocket motor, the size and configuration of the motor housing, the nozzle, and the combustion chamber are substantially fixed by external requirements so that the primary factor affecting combustion chamber instability at the disposal of the designer is the pattern of orifices in the fuel injector plate. Therefore, as a practical matter, the problem of eliminating high frequency combustion chamber instability resolves itself into an experimental search for a propellant or fuel injector plate with a suitable stable high performing orifice pattern.

Heretofore, this search for such an injector plate with a suitable orifice pattern required an entire rocket motor to be built to scale and operated. Then, if the pattern of orifices in the injector plate produced high frequency instability, it would occur so rapidly that the first indication of its presence would be the destruction of the motor. The next rocket motor would have to be rebuilt with an injector plate having another pattern of orifices. This would continue until by chance, an injector plate with an orifice pattern which would not produce high frequency combustion chamber instability could be discovered. In addition, once such an orifice pattern was discovered, it would be necessary to repeat the test on it a number of times (on the order of 1000 repeat tests) to establish precisely the reliability factor.

It is apparent that considerable savings in cost and time would occur if the motor could be shut down at the first indication of combustion chamber instability, and before the occurrence of damage. One of the objects of this invention therefore is to provide a means for detecting the first indication of combustion chamber instability and using the detecting device to control or signal motor shutdown.

The injector plate in a rocket motor is a generally circular wall with a comparatively large number of fuel and/or oxidizer emitting orifices extending therethrough. Consequently, the production of each injector plate is time consuming and laborious. Heretofore, it was difficult enough to discover an injector plate orifice pattern which was even marginally satisfactory without carrying the search further to obtain one with superior stability characteristics. In addition, there was no procedure for comparing precisely the stability characteristics of one injector plate with those of another. Since heretofore the occurrence of instability was a matter of happenstance, it is apparent that a device which simplifies and expedites the search for suitable injector plate orifice patterns would be very helpful in the design of a rocket motor.

A measure of combustion chamber instability is the resistance of the rocket motor to such instability when a shock wave occurs in the combustion chamber. In particular, rocket motors with poor instability characteristics will become unstable when only small shock waves occur in the combustion chamber. In contrast, highly stable rocket motors can resist substantially larger shock waves without becoming unstable. Consequently, one method of evaluating the instability characteristics of the rocket motor and comparing injector plate orifice patterns would be to deliberately inject a series of shock waves of known magnitude and increasing intensity into the combustion chamber and determine thereby the magnitude of the shock wave which finally causes the motor to become unstable. What is needed, therefore, and comprises another object of this invention is a device for injecting shock waves of predetermined magnitude inside the compustion chamber of the rocket motor.

This invention in its broadest aspects is based on the discovery that it is not necessary to completely form a fuel injector plate to determine the combustion chamber instability characteristics of a particular motor. Instead, an injector plate with a predetermined orifice pattern formed only on its periphery will exhibit substantially the same behavior, from the standpoint of combustion chamber instability, as a completely formed injector plate. Consequently, by designing the rocket motor so the orifices are located in removable pods around the periphery of an injector pod support wall inside the motor, a number of different orifice patterns can be quickly and easily tested.

In order to avoid destruction or damage to the motor when combustion chamber instability occurs, a novel electronic rocket motor shutdown device is connected to the motor. This shutdown device includes a detection circuit which actuates a motor control to shut off the motor at the first indication of high-frequency instability.

In order to measure the stability characteristics of the particular orifice pattern, a novel pulse gun has been developed. The pulse gun contains a powder charge, and its discharge end, or muzzle portion, is located inside the combustion chamber of the rocket motor. In addition, a burst diaphragm is positioned between the muzzle portion and the powder charge. With this arrangement, when the powder charge is firsd, the burst diaphragm is ruptured and a shock wave is discharged into the combustion chamber. Since the rupture strength of the various burst diaphragms available for use can be standardized and the number of grains in the powder charge are known, the intensity of the shock wave produced by a pulse gun can be closely controlled. Consequently, when a pulse gun containing a known powder charge and a known burst diaphragm is discharged into the combustion chamber of a rocket motor the magnitude of the injected shock wave is known.

In this invention, a number of pulse guns are mounted on the rocket motor with their discharge or muzzle ends terminating inside the combustion chamber of the motor. With this arrangement, the performance of a rocket motor with a particular injection plate orifice pattern can be determined by successively firing the pulse guns into the combustion chamber of the rocket motor. The pulse guns are designed so that when they are fired, a series of shock waves of gradually increasing magnitude are injected into the combustion chamber until the motor finally becomes unstable and the detecting circuit shuts down the motor. The intensity of the shock wave necessary to produce this instability is a measure of the performance of the orifice pattern being tested. Consequently the behavior of a rocket motor with injector plates having different orifice patterns can be compared with each other by simply comparing the intensity of the shock wave required to cause the rocket motor to become unstable.

These and other objects of this invention will become more apparent when read in the light of the accompanying specification and drawings wherein:

FIG. 7 is a side view partly in section of the pulse gun used with the test motor;

FIG. 8 is an exploded perspective view of the pulse gun;

FIG. 9 is an enlarged cross-sectional view showing a part of the muzzle portion and loading portion of the pulse gun shown in FIG. 7, clamped together with the burst diaphragm held therebetween; and FIG. 10 is a circuit diagram of the control device for shutting down the rocket motor when combustion chamber instability occurs.

Figure 1:
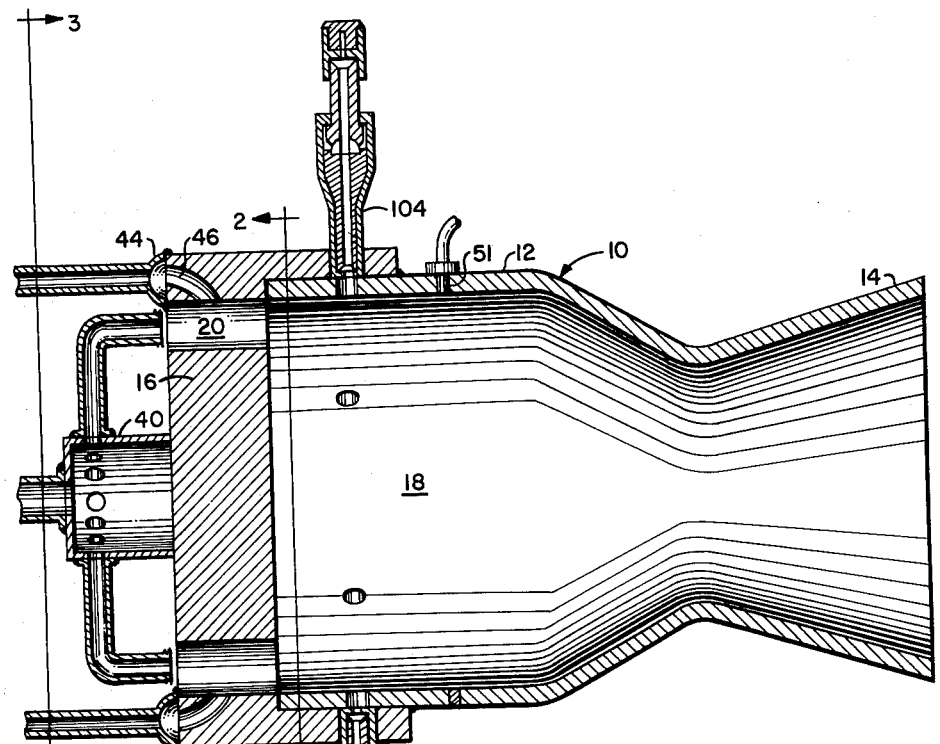
FIG. 1 is a side sectional view of a test rocket motor embodying the novel features of this invention, but with the fuel and oxidizer injector pods removed.

Referring now to FIG. 1 of the drawings, the rocket motor indicated generally by the reference numeral 10 comprises a motor housing 12 with a nozzle 14 at one end and an injector pod support wall 16 at the other end. A combustion chamber 18 is disposed between the nozzle portion and the injector pod support wall 16 in a manner well known in the art.

Figure 2:
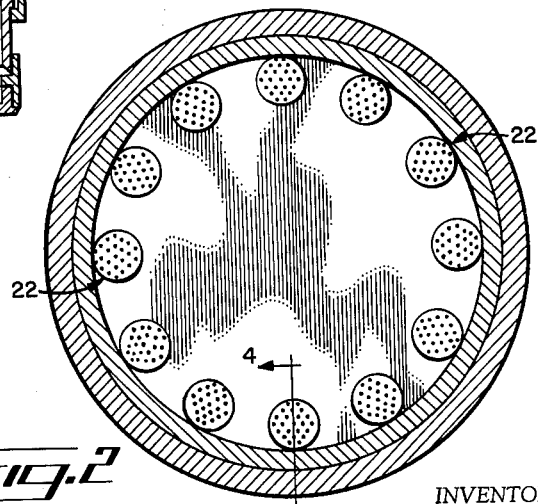
FIG. 2 is a cross-sectional view taken on the line 2—2 of FIG. 1.
Figure 4:
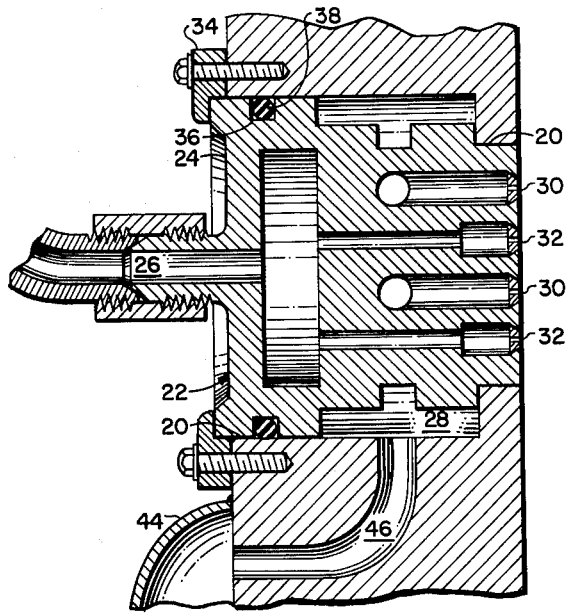
FIG. 4 is an enlarged view of a portion of the test motor taken on the line 4—4 of FIG. 2.
Figure 5:
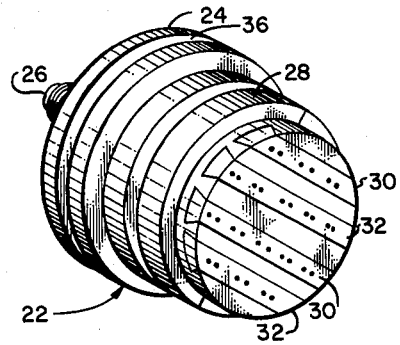
FIG. 5 is a perspective view of a fuel and oxidizer injector pod adapted to be mounted in the injector plate of the test rocket motor.

The injector pod support wall 16 is provided with a plurality of injector pod receiving openings 20 extending therethrough for removably receiving fuel and oxidizer injector pods 22 (see FIGS. 2 and 4). As best seen in FIG. 5, each injector pod 22 comprises a housing 24, with separate fuel and oxidizer inlet conduits 26 and 28. These communicate with corresponding fuel and oxidizer exit portions 30 and 32. It is understood, however, that if the rocket motor being designed uses a mono-propellant fuel, the injector pod would require only one fuel inlet conduit and one fuel exit portion.

Figure 6:
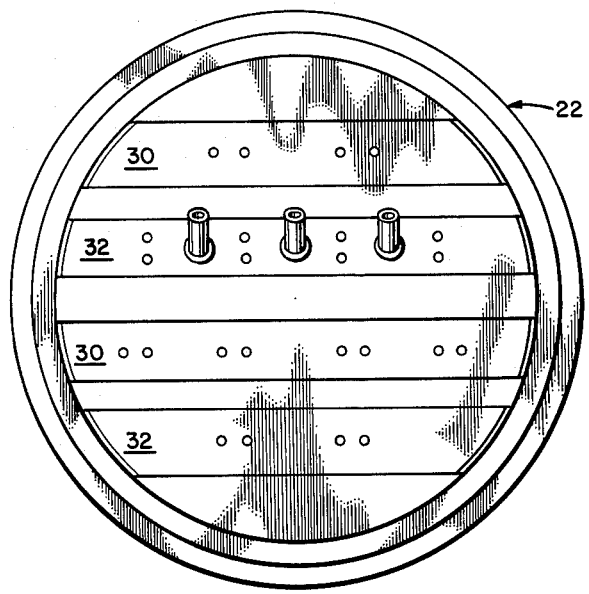
FIG. 6 is an enlarged end view of the injector pod.

As seen in FIGS. 5 and 6, the fuel exit portions 30 and the oxidizer exit portions 32 consist of strips or plates having a predetermined pattern of perforations or orifices (see FIG. 6). These strips are removably attached by any suitable means to an end of the injector pod 22. With this arrangement it is apprent that the pattern of orifices on the exit portion of each injector pod can be varied by removing the strips and replacing them with others having a different pattern of orifices.

Figure 3:
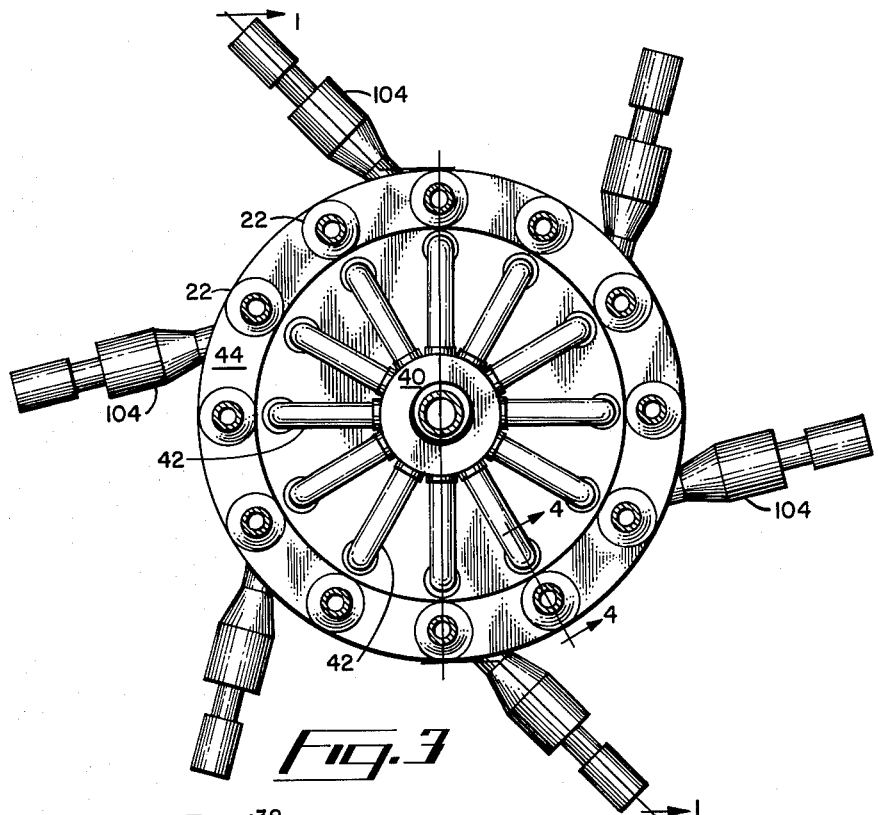
FIG. 3 is an end view taken on the line 3—3 of FIG. 1.

As best seen in FIG. 4, the injector pods 22 are removably mounted in the injector pod receiving openings 20 in the injector pod support wall 16 by means of a suitable clamp 34. The injector pod housing 22 is circular in cross-section although its cross sectional shape is not critical, and it is provided with a peripheral O-ring receiving groove 36 for receiving an O-ring 38. With this arrangement, when each injector pod 22 is mounted in an injector pod receiving opening 20, the O-ring 38 prevents high pressure gases from the combustion chamber from escaping through the injector pod support wall 16. As seen in FIGS. 2 and 3, the injector pods 22 are mounted on the periphery of support wall 16 in a circle in uniformly-spaced relationship to each other. This is in accordance wtih the discovery that the instability characteristics of a rocket motor with an injector plate having only a peripheral orifice pattern is substantially the same as it is with an injector plate where the orifice pattern is completely formed over its entire surface.

As seen in FIG. 3, a fuel manifold 40 is mounted on the outer surface of the injector pod support wall 16. This manifold is connected to fuel inlet conduits 26 on each injector pod 22 by means of radial tubes 42. Similarly, an oxidizer manifold 44 mounted on support wall 16 and concentric therewith commmunicates with the oxidizer inlet conduits 28 in each injector pod 22 by means of passageways 46, extending through the support wall (see FIG. 4). With this arrangement, fuel pumped to fuel manifold 40 and oxidizer pumped to the oxidizer manifold 44 will be distributed uniformly to the fuel inlet portion and oxidizer inlet portion of each injector pod 22 whereby the fuel and oxidizer are sprayed into the combustion chamber of the motor.

As stated above, the instability characteristics of a rocket motor with peripherally disposed injector pods will be substantially the same as the instability characteristics of a rocket motor with a completely formed injector plate. Consequently, both the fuel consumption of the test motor and its thrust will be greatly decreased permitting a substantial saving in operating costs. In addition, the low motor thrust permits a less massive and consequently less complex and expensive test stand to be used than would otherwise be necessary if the rocket motor were operating at its rated thrust.

If the particular pattern of orifices in the injector pods causes combustion chamber instability to occur, it is important to be able to detect its presence before the motor is damaged or destroyed. It has been found that the onset of combustion chamber instability occurs when the amplitude of the pressure fluctuations inside the combustion chamber of the rocket motor exceeds a predetermined magnitude; these pressure fluctuations occur at a predetermined frequency, and they persist for a predetermined length of time. When this happens, it is important to be able to shut down the motor immediately. To do this, it is necessary to provide a detecting or control circuit which responds only when all three of these conditions or parameters occur.

In the present invention, this has been done by mounting a pressure transducer 51 inside the combustion chamber of the motor (see FIG. 1). As shown in FIG. 10, this pressure transducer is connected to a control circuit indicated generally by the reference numeral 50. The transducer 51 responds to pressure fluctuations inside the combustion chamber of the rocket motor and converts these pressure fluctuations to signals applied to control circuit 50. The control circuit comprises a conventional bandpass amplifier 52 such as that shown in the text book "Radio Engineering" by Terman, 2nd Edition, page 217. This amplifier filters out the basic pressure component inside the combustion chamber of the rocket motor and amplifies only the pressure fluctuations. The output of the bandpass amplifier is fed into a conventional voltage comparator 54 such as that shown in the text book "Electron Tube Circuits" by Seely 1st Edition, page 430. The voltage comparator emits a square wave pulse whenever the output from the bandpass amplifier, and hence the intensity of the pressure fluctuations inside the combustion chamber of the rocket motor, exceeds a predetermined magnitude. This is the first parameter of the three necessary for the detection of combustion chamber instability.

Each pulse emitted from the voltage comparator 54 is fed through a condenser 56 which eliminates the direct current (D.-C.) component from the pulse, thereby converting the square wave pulse output from the voltage comparator to a spike wave form. As seen in FIG. 10, condenser 56 is connected to the grid of tube 58 in control circuit 59. Tube 58 is biased below cutoff so it is normally nonconductive, but whenever the voltage comparator emits a pulse, the voltage on the grid of tube 58 momentarily increases, causing tube 58 to become momentarily conductive.

The anode of tube 58 is grounded. Consequently, each time tube 58 becomes conductive, its cathode becomes more positive. The cathode of tube 58 is connected to the grid of a thyratron tube 62 through a biasing resistor 60. The thyratron tube 62 is biased so it is normally nonconductive but when tube 58 becomes conductive, it increases the potential on the grid of the thyratron tube until it too becomes conductive. As seen, the anode of thyratron tube 62 is connected to a condenser 64 in a mono-stable multi-vibrator indicated generally by the reference numeral 66.

The multi-vibrator 66 includes a tube 68 and a tube 70. The anode of tube 68 is connected to the grid of tube 70 and the anode of tube 70 is connected through condenser 64 to the grid of tube 68. Tubes 68 and 70 are biased so that when the multi-vibrator is in a quiescent state, tube 68 is conductive and tube 70 is nonconductive. With this arrangement, and with the anode of the thyratron tube 62 connected by terminal wire 65 both to the grid of tube 68 and one side of condenser 64, when the thyratron 62 becomes conductive, its internal resistance drops, causing a drop in the potential of terminal wire 65. This causes condenser 64 to discharge through the tube 62. When this happens, the potential on the grid of tube 68 drops and the tube 68 then becomes nonconductive. In addition, the discharge of condenser 64 has the effect of "blowing out" the thyratron tube 62 because of the reverse current.

When tube 68 becomes nonconductive its anode becomes more positive. Since the anode of tube 68 is connected to the grid of tube 70 through biasing resistor 71, when the anode of tube 68 becomes more positive it makes the grid of tube 70 more positive, and this makes tube 70, which is biased so it is normally nonconductive, become conductive. When tube 70 becomes conductive its anode potential drops. Since thyratron tube 62 has now become nonconductive (due to the reverse current described above), the drop in potential of the anode of tube 70 permits the condenser 64 to charge up again at a rate determined by its capacitance and by the magnitude of fixed resistor 72. Consequently, condenser 64 and resistance 72 form an RC timing circuit and to control the time constant of this circuit, the switch 74 is provided so that other condensers, 64', 64", etc., having different capacitance can be connected to the circuit as desired. As the condenser 64 charges up, the potential on terminal wire 65 increases until the tube 68 again becomes conductive.

In summary to this point, each time the voltage comparator 54 emits a pulse, the thyratron tube 62 becomes conductive and its internal resistance drops to a low value causing tube 68 to become nonconductive as described above. If another pulse from voltage comparator 54 occurs before condenser 64 has time to charge up again, the potential on the grid of tube 68 will remain below cutoff so that tube 68 will remain nonconductive and tube 70 will remain conductive. It can be seen, therefore, that if the frequency of pulses from the voltage comparator 54 and hence the frequency of pressure fluctuations in the combustion chamber of the rocket motor exceeding a predetermined amplitude occur at or above a predetermined frequency, tube 68, which is normally conductive, becomes nonconductive. The various condensers 64, 64', 64", etc., associated with switch 74 and resistance 72 provide a means for changing the frequency at which tube 68 becomes nonconductive. Consequently, the multivibrator 66 with the thyratron control tube 62 in the control circuit 59, including the RC charging circuit comprising condenser 64 and resistance 72, provide a means for using the multivibrator as a frequency detector and this is the second parameter which circuit 50 must be sensitive to in order to detect the beginning of combustion chamber instability in the rocket motor.

As stated above, tube 68 becomes nonconductive only when the frequency of pulses from the voltage comparator 54 exceeds a predetermined level. Normally, tube 68 is conductive so its anode is at a low potential. The anode of tube 68 is connected to the grid of tube 76 in the multivibrator in control circuit 73 through a biasing resistor 75. When the anode of tube 68 is at a low potential, it keeps the grid of tube 76 at a low potential so that tube 76 is nonconductive when tube 68 is conductive.

When tube 76 is nonconductive, its anode is at a high potential. The anode of tube 76 is connected to the grid of tube 78, also in control circuit 73, through biasing resistor 79. With this arrangement, when tube 76 is nonconductive and its anode is at a high potential, the grid of tube 78 is at a high enough potential to cause tube 78 to become conductive.

As seen in the circuit diagram, the anodes of tubes 76 and 78 are connected to a second mono-stable multivibrator indicated generally by the reference numeral 80. Mono-stable multivibrator 80 is generally similar to mono-stable multivibrator 66 in that it contains cross-coupled tubes 82 and 84. The anode of tube 82 is connected through biasing resistor 83 to the grid of tube 84 and the anode of tube 84 is connected through one of a series of possible condensers 86 back to the grid of tube 82 in the manner described in connection with mono-stable multivibrator 66.

As stated above, when tube 68 is conductive, tube 76 is non-conductive and tube 78 is conductive. Consequently, the anode of tube 78 is at a low potential. The anode of tube 78 is connected to the grid of tube 82 in multivibrator 80. When the anode of tube 78 is at a low potential it keeps the potential of the grid of tube 82 down far enough so that tube 82 is nonconductive. It is noted, however, that the grid of tube 84 is biased so that it is conductive and its anode is at a low potential. The opposite terminals of condenser 86 are connected to the anodes of tubes 78 and 84. Consequently, when the anodes of tubes 78 and 84 are at substantially the same potential so that both are nonconductive, the terminals of condenser 86 are also at the same general potential and so condenser 86 has no substantial charge.

If, however, tube 68 becomes nonconductive because pressure fluctuations in the combustion chamber of the rocket motor exceeding a predetermined magnitude occur above a predetermined frequency, tube 68 becomes nonconductive and this in turn causes tube 76 to become conductive and causes tube 78 to become nonconductive. When tube 78 in control circuit 73 becomes nonconductive it acts like an open circuit from the standpoint of condenser 86 and the potential on terminal wire 88 begins to rise so that condenser 86 in multivibrator 80 begins to charge. Terminal wire 88 connected to condenser 86 is also connected to the grid of tube 82. With this arrangement, if condenser 86 charges sufficiently, the potential of terminal wire 88 rises and causes the grid of tube 82 to become more positive until tube 82 finally becomes conductive. When tube 82 becomes conductive its anode becomes more negative and consequently, junction point 90, which is connected to the anode of tube 82, becomes more negative.

Junction point 90 is connected through a biasing resistor 92 to the grid of tube 94. When junction terminal 90 becomes more negative, the grid of tube 94 becomes more negative, causing tube 94 to become nonconductive. The anode of tube 94 is connected to relay coils 96 which operate to control a solenoid valve 98 in the fuel lines 99 of the rocket motor in a manner well-known in the art. When tube 94 becomes nonconductive, the current flow to relay coils 96 is cut off, causing solenoid valve 98 to close and shut down the rocket motor in a manner well known in the art.

In partial summary to this point, it is noted that tube 94 becomes nonconductive, and hence the current flow through relay coils 96 is cut off, only if condenser 86 is permitted to charge sufficiently. The charging time required for condenser 86 is determined by the combination of condenser 86 and variable resistance 87 which forms another typical RC charging circuit. The time constant of this circuit or, in other words, the time required for condenser 86 to become fully charged and cause tube 82 to again become conductive, depends upon the capacitance of condenser 86 and the magnitude of resistance 87. By changing this capacitance, as by the insertion of condensers 86', 86'', etc., into the circuit or by varying the resistance, the charging time necessary to cause tube 82 to become conductive and hence cause the current flow through relay coils 96 to be cut off, can be varied as desired. Note, however, condensers 86 charge only while tube 78 is nonconductive and tube 78 is nonconductive only while tube 68 is nonconductive, and tube 68 remains nonconductive only while pressure fluctuations in the combustion chamber of the rocket motor exceeding a predetermined magnitude occur at or above a predetermined frequency. Consequently, the RC circuit comprising condenser 86 and resistance 87 in combination with the mono-stable multivibrator 80 supplies the required time parameter. With this arrangement it is apparent that solenoid valve 98 will open to shut off the rocket motor only when pressure fluctuations in the combustion chamber of the rocket motor exceed a predetermined amplitude and occur at a predetermined frequency and the effect persists for a predetermined length of time. It is further noted that when tube 82 becomes conductive it causes tube 84 to become nonconductive because the anode of tube 82 is connected to the grid of tube 84. When tube 84 becomes nonconductive, its anode potential rises causing the neon indicator tube 100 to glow, indicating the presence of combustion chamber instability. In the meantime, as described above, the circuit 50 has caused solenoid valve 98 to shut down the rocket motor.

In order to restart the motor, a push button switch 102 connected to the anode of tube 82, is provided. When this switch is pressed, tube 82 becomes nonconductive because its anode is disconnected from the circuit. Consequently, junction terminal 90 becomes more positive and this in turn causes tube 94 to become conductive again so that current can flow to the relay coils 96, causing solenoid valve 98 to permit the motor to be restarted.

It is important to note that multivibrator 80 has no memory. The reason is that when a momentary pulse occurs in tube 68 and makes tube 68 momentarily nonconductive, tube 78 becomes nonconductive and the charge on condenser 86 begins to build up as described above. However, after the pulse which has made tube 68 momentarily nonconductive ceases, tubes 68 and 78 revert to a conductive state. When tube 78 is in a conductive state, its internal resistance is low and it provides a discharge path for condensers 86 which cause condensers 86 to discharge. Without this feature a plurality of transient pulses not sufficient alone to cause a motor shut-down would cause a charge to accumulate on condensers 86 until finally any transient pulse that could cause tube 82 to become conductive, would cause an erroneous shut-down.

Referring now to FIGS. 1 and 3 of the drawings, a plurality of pulse guns, each indicated generally by the reference numeral 104, are mounted on motor housing 12. Each pulse gun comprises a housing 100 (see FIG. 7). The housing itself comprises a generally tubular muzzle portion 108 and a tubular loading portion 110 for receiving a blank cartridge 122 (see FIG. 8). In assembled relation, the muzzle portion and the loading portion are held together by a coupling nut 112.

As shown in FIGS. 7 and 9, the inner end 109 of the tubular muzzle portion 108 is counter-bored at 114 for receiving a burst diaphragm holder 116. A burst diaphragm 118 having a predetermined rupture strength is mounted on the burst diaphragm holder 116 and clamped between diaphragm holder 116 and the end 121 of the loading portion 110, as shown in FIG. 9. For reasons to become apparent below, this arrangement provides a convenient means for removing or replacing a burst diaphragm after a pulse gun is fired. A gasket 120 (see FIG. 9), may be inserted between the counterbored end 114 of the muzzle portion 108 and the burst diaphragm holder to prevent gas leakage past the burst diaphragm holder.

Cartridge 122 is positioned in the tubular loading portion 110, as best seen in FIG. 7. An adapter 124 is threaded over the inner end 111 of the loading portion. The adapter is counterbored at each end and the space between the base of the counterbores provides a seat for the disk obdurater or firing pin holder 126 (see FIG. 8). The disk obdurater or firing pin holder 126 is provided with a counterbore 128 (see FIG. 7) for receiving the head of a firing pin 130. A combined primer retainer and closure 132 is threaded on adapter 124, as shown in FIG. 7. This element holds the head of the firing pin 130 in the counterbored portion 128 of the disk obdurater 126. The primer retainer is also counterbored for receiving and holding a squib or igniter 134. Electric leads 136 communicating with the squib or igniter 134 extend through the primer retainer for connection to a voltage source (not shown). When the voltage source is connected to leads 136 and causes a spark in the squib igniter, the cartridge is fired. The pressure from the hot gases from the cartridge is initially confined in the loading portion 110. Consequently, the pressure in the loading portion will build up until it exceeds the rupture strength of the burst diaphragm 118. When this happens the burst diaphragm will break and a shock wave will suddenly form and move through the pulse gun housing 100 and out the firing end 138 of muzzle portion 108. The magnitude or intensity of a shock wave thus formed will depend on two factors. One factor is the amount of powder in the blank cartridge 122, and the other factor is the rupture strength of the burst diaphragm 118. It is further noted that the burst diaphragm has the added function of insulating the blank cartridge from the high temperature gases in the combustion chamber of the rocket motor and thereby preventing it from firing prematurely.

Referring now to FIGS. 1 and 3 of the drawing, a plurality of pulse guns 104 are mounted in the housing with their muzzle portions extending into the combustion chamber of the housing. As shown in FIG. 3, the pulse guns are positioned so when they are fired, the shock waves are directed generally tangentially to the inner walls of the combustion chamber housing in a direction most likely to stimulate combustion chamber instability. The rupture strength of the burst diaphragms in each of the pulse guns shown in FIG. 3 is correlated with the amount of powder in the blank cartridges 122 so that when the pulse guns are fired in sequence, shock waves of gradually increasing intensity can be discharged into the combustion chamber of the rocket motor.

The device is used in the following manner:

The size and shape of the motor housing and particularly the nozzle portion and combustion chamber are essentially fixed by mission requirements. A rocket motor is then built to scale, but instead of a conventional injection plate, an injection pod support wall 16, as described above, closes off the end of the rocket motor housing opposite the nozzle portion 14. Openings extend through the walls of the motor housing for receiving the pulse guns 104 as described above. Next fuel and oxidizer injector pods 22 with the removably mounted perforated strips 30 and 32, serving as fuel and oxidizer exit portions, are mounted in the injector pod receiving openings 20, as shown in FIGS. 2 and 4. A transducer 51 is mounted on the rocket motor 10 inside the combustion chamber 18. The leads from this transducer are connected to the control circuit 50 shown in FIG. 10. Next the rocket motor is started up. After the motor has started, the pulse guns 104 are fired in sequence. This causes a sequential series of shock waves of gradually increasing intensity to be directed into the combustion chamber 18. With this arrangement, if one of the shock waves is of sufficient magnitude to upset the normal combustion process and thereby produce frequency combustion chamber instability, the circuit 50 promptly shuts down the motor. At the same time, by knowing which pulse gun produced the shock wave which caused the rocket motor to become unstable, the magnitude of the shock wave can be determined.

The injector pods 22 are then removed from the injector pod support wall and the perforate fuel and oxidizer injection strips 30 and 32 are removed and replaced by others having a different perforate pattern. The test is then repeated. In this way, for any particular rocket motor, a large number of injector plates having different patterns of perforation can be evaluated and compared with each other so that the pattern of injector plate perforations which produces the most desirable performance in the rocket motor can be readily discovered. With this arrangement, rocket motors with any desired degree of stability can be designed.

It is to be understood that the form of the invention herewith shown and described is to be taken as a preferred example of the same, and that various changes in the shape, size, and arrangement of the parts may be resorted to without departing from the spirit of this invention or the scope of the claims.

We claim:

1. An apparatus of the class described comprising in combination a rocket motor and a pulse gun, said rocket motor comprising a motor housing having a nozzle portion, a fuel injection portion, and a combustion chamber, said pulse gun comprising a tube having a muzzle portion and a loading portion, said pulse gun connected to said motor housing in such a way that said muzzle portion opens into said combustion chamber, a rupturable diaphragm removably mounted in said tube, both for insulating and separating the loading portion of the tube from said muzzle portion, and means for filling the loading portion of the tube with gas under sufficient pressure to rupture the diaphragm whereby a shock wave is formed and moves out the muzzle portion of said tube into said combustion chamber.

2. An apparatus of the class described comprising in combination a rocket motor and a pulse gun, said rocket motor comprising a motor housing having a nozzle portion, a fuel injection portion, and a combustion chamber, said pulse gun comprising a tube having a muzzle portion and a loading portion for receiving a blank cartridge, said pulse gun connected to said motor housing in such a way that said muzzle portion opens into said combustion chamber, a diaphragm removably mounted in said tube and separating and insulating the loading portion of the tube from the muzzle portion, means for detonating the blank cartridge, and the amount of powder in the blank cartridge and the rupture strength of the diaphragm being selected so when the blank cartridge is detonated, the expanding gases rupture the diaphragm and produce a shock wave having a predetermined intensity which travels out the muzzle portion of the tube and into said combustion chamber.

3. The apparatus described in claim 2 wherein a plurality of pulse guns are connected to said rocket motor housing, each with its muzzle portion opening into said combustion chamber, and each with the amount of powder in the blank cartridge and the rupture strength of the diaphragm selected so that by sequentially firing the pulse guns, shock waves of gradually increasing intensity may be discharged into the combustion chamber of the rocket motor housing.

4. An apparatus of the class described comprising in combination a rocket motor, said rocket motor including a motor housing having a nozzle portion at one end, an injection pod support wall at the other end, and a combustion chamber therebetween, said support wall having injector pod receiving openings formed therein for removably receiving injector pods whereby the stability characteristics of the rocket motor may be varied in accordance with the design of the injector pods mounted in the openings in the support wall, a pulse gun, said pulse gun having a muzzle portion and a loading portion, said pulse gun connected to said motor housing in such a way that said muzzle portion opens into said combustion chamber, a diaphragm removably mounted in said pulse gun and separating the loading portion from the muzzle portion, means for filling the loading portion of the pulse gun with gas under sufficient pressure to rupture the diaphragm whereby a shock wave is formed and moves through said pulse gun out the muzzle portion into the combustion chamber of the motor housing, a pressure transducer mounted in the combustion chamber, and a control circuit connected to said pressure transducer for automatically shutting down the rocket motor only when the amplitude of the pressure fluctuations in the combustion chamber caused by said shock wave from the pulse gun achieves a pre-determined amplitude and occurs at a pre-determined frequency and persists for a pre-determined length of time.

5. An apparatus of the class described comprising in combination a rocket motor, said rocket motor including a housing having a nozzle portion at one end, an injection pod support wall at the other end, and a combustion chamber therebetween, said support wall having peripherally disposed injector pod receiving openings formed therein for receiving injector pods, injector pods removably mounted in said openings, each injector pod comprising an inlet conduit and a perforated exit portion, the pattern of the perforations in the exit portions of the pods determining the stability characteristics of the rocket motor, and a pulse gun, said pulse gun comprising a tube, said tube having a muzzle portion and a loading portion, said pulse gun connected to said housing in such a way that said muzzle portion opens into said combustion chamber, a diaphragm removably mounted in said tube and separating the loading portion from the muzzle portion, a blank cartridge in said loading portion, means for detonating the blank cartridge, the amount of powder in the blank cartridge and the rupture strength of the diaphragm being selected so when the blank cartridge is detonated, the expanding gases rupture the diaphragm and produce a shock wave having a pre-determined intensity which travels through the tube, out the muzzle portion, and into the combustion chamber, a pressure transducer mounted in the combustion chamber, and a control circuit connected to said pressure transducer for automatically shutting down the rocket motor only when the amplitude of the pressure fluctuations in the combustion chamber exceeds a pre-determined amplitude and occurs at a pre-determined frequency and persists for a pre-determined length of time, said control circuit comprising a bandpass amplifier connected to the transducer for amplifying the signals reflecting the pressure fluctuations in the combustion chamber of the rocket motor, a voltage comparator connected to said amplifier in such a way that the voltage comparator emits a pulse whenever the amplitude of the signals from the transducer exceeds a pre-determined level, a first multi-vibrator, means connected between said first multi-vibrator and said voltage comparator for causing a pre-determined response in said first multi-vibrator only when the frequency of pulses from said voltage comparator exceeds a pre-determined level, a second multi-vibrator, means connecting said second multi-vibrator with said first multi-vibrator for causing a response in said second multi-vibrator only when the said pre-determined response in said first multi-vibrator persists for a pre-determined period of time, and a motor controlling element connected to said second multi-vibrator and operating when said response occurs in said second multi-vibrator.

References Cited by the Examiner
UNITED STATES PATENTS

| | | | |
|---|---|---|---|
| 2,500,334 | 3/1950 | Zucrow | 60—35.6 X |
| 2,580,365 | 12/1951 | Simmonds. | |
| 2,620,627 | 12/1952 | Nardone | 60—39.47 |

(Other references on following page)

UNITED STATES PATENTS

| | | | |
|---|---|---|---|
| 2,769,701 | 11/1956 | Williamson | 102—25 X |
| 2,778,309 | 1/1957 | Filstrup | 102—25 |
| 2,783,712 | 3/1957 | Smith | 102—25 |
| 2,848,872 | 8/1958 | Proell et al. | 60—39.47 |
| 2,902,824 | 9/1959 | Sponzilli | 60—39.09 |
| 2,912,822 | 11/1959 | Hooker | 60—39.09 |
| 2,929,208 | 3/1960 | Schultz | 60—39.74 |
| 2,940,259 | 6/1960 | Mantler | 60—39.74 |
| 2,975,632 | 3/1961 | Ganahl | 73—116 |
| 3,010,399 | 11/1961 | Manning | 89—1 X |
| 3,015,231 | 1/1962 | Ganahl | 73—116 |
| 3,110,258 | 11/1963 | Weber | 102—25 |

FOREIGN PATENTS

| | | |
|---|---|---|
| 627,722 | 8/1949 | Great Britain. |

MARK NEWMAN, *Primary Examiner.*

JULIUS E. WEST, ABRAM BLUM, SAMUEL LEVINE, *Examiners.*

C. R. CROYLE, S. N. GARBER, D. HART,
*Assistant Examiners.*